United States Patent [19]

Duke et al.

[11] 4,429,363

[45] Jan. 31, 1984

[54] METHOD AND APPARATUS FOR MANAGING DATA MOVEMENTS FROM A BACKING STORE TO A CACHING BUFFER STORE

[75] Inventors: Alan H. Duke; Michael H. Hartung; Frederick J. Marschner, all of Pima County, Ariz.

[73] Assignee: International Business Machines Corporation, Armonk, N.Y.

[21] Appl. No.: 311,362

[22] Filed: Oct. 15, 1981

[51] Int. Cl.³ .......................... G06F 13/00; G06F 3/06
[52] U.S. Cl. ................................................. 364/200
[58] Field of Search ... 364/200 MS File, 900 MS File

[56] References Cited

U.S. PATENT DOCUMENTS

| 3,566,358 | 2/1971 | Hasbrouck | 364/200 |
| 3,588,829 | 6/1971 | Boland et al. | 364/200 |
| 4,075,686 | 2/1978 | Calle et al. | 364/200 |
| 4,084,236 | 4/1978 | Chelberg et al. | 364/200 |
| 4,148,098 | 4/1979 | McCreight et al. | 364/200 |
| 4,149,239 | 4/1979 | Jenkins et al. | 364/200 |
| 4,217,640 | 8/1980 | Porter et al. | 364/200 |

*Primary Examiner*—Jerry Smith
*Assistant Examiner*—Mark P. Watson
*Attorney, Agent, or Firm*—H. F. Somermeyer

[57] ABSTRACT

In a storage hierarchy, promotion of data from a backing store to a caching buffer store is restricted based upon status of the cache and activity of a last storage reference. Observed writing activity selectively inhibits data promotion. Data promotion occurs after completion of a series of storage access requests. A peripheral data storage system is described.

13 Claims, 4 Drawing Figures

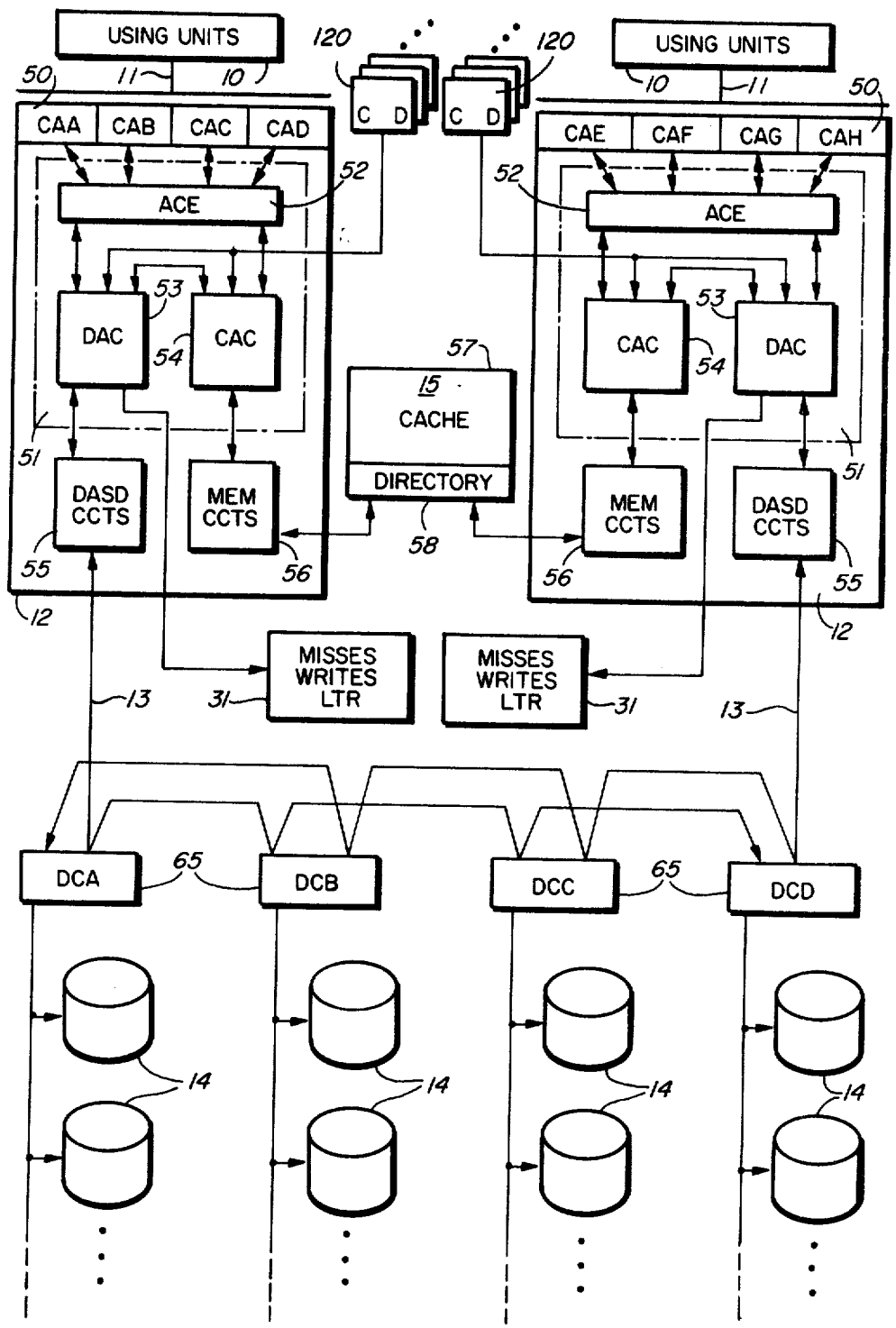
FIG_2

METHOD AND APPARATUS FOR MANAGING DATA MOVEMENTS FROM A BACKING STORE TO A CACHING BUFFER STORE

FIELD OF THE INVENTION

The present invention relates to multilevel storage hierarchies, more particularly to the control thereof with respect to data residence in upper levels of the hierarchies.

BACKGROUND OF THE INVENTION

Peripheral storage hierarchies have been used for years for providing an apparent store as suggested by Eden, et al. in U.S. Pat. No. 3,569,938. Eden, et al. teach that in a demand paging or request system, caching data in a cachetype high-speed front store (buffer) can make a peripheral storage system appear to have a large capacity, yet provide rapid access to data, rapid access being faster than that provided to the normal backing store. Eden, et al. also teach that the backing store can be a retentive store, such as magnetic tape recorders and magnetic disk recorders, while the front store can be a volatile store, such as a magnetic core store. With the advances in data storage technology, the front store typically includes semiconductive-type data storage elements. U.S. Pat. No. 3,839,704 shows another form of the storage hierarchy.

An important aspect of storage hierarchies is enabling data integrity. That is, the data received from a user, such as a central processing unit (CPU) or other data handling device, should be returned to the supplying unit either correct or with an indication that errors may exist. Also, it is typical practice in storage hierarchies to move data from a higher level to a lower level for such retentive storage, as well as limit the data in the higher levels such that other data can be stored for rapid access. U.S. Pat. No. 4,020,466 shows copying change from a high-level store to a backing store while U.S. Pat. No. 4,077,059 shows forcing copy-back under predetermined conditions. Such copy-back operations can consume storage hierarchy performance time, i.e., so much data may be copied back that access to the data by a using unit may be degraded. This problem is partially solved by U.S. Pat. No. 3,588,839, which teaches that the only data that need be copied back from a high-level storage unit to a low-level storage unit is that data that is altered, i.e., where there is noncongruence between data in a backing store and data in a front store.

Storage hierarchies have taken diverse forms. For example, in accordance with the Eden, et al. U.S. Pat. No. 3,569,938, a single high-speed store serviced several users. U.S. Pat. No. 3,735,360 shows that each processor can have its own high-speed store, or cache, for different performance reasons. Performance of the storage hierarchies also is affected by the algorithms and other controls used to place predetermined data into the cache, or high-speed storage portion. Accordingly, U.S. Pat. No. 3,898,624 shows that varying the time of fetching data from a backing store to a front, or caching, store can be selected by the computer operator in accordance with the programs being executed in a using CPU. In this manner, it is hoped that the data resident in the cache, or upper level of the hierarchy, will be that data needed by the CPU, while excess data not needed is not resident; this arrangement allows more useful data to be stored in the higher level storage portion. All of these operations become quite intricate. Accordingly, evaluation programs for storage hierarchies have been used to evaluate how best to manage a storage hierarchy. U.S. Pat. Nos. 3,964,028 and 4,068,304 show performance monitoring of storage hierarchies for achieving these goals. Even at that, much remains to be done in various types of storage hierarchies for enhancing optimum performance while ensuring data integrity. Much of the work with respect to storage hierarchies has occurred in the cache and main memory combinations connected to a using CPU. The principles and teachings from a cached main memory relate directly to caching and buffering peripheral systems, as originally suggested by Eden et al., supra. Main memory has been used prior to Eden, et al. for buffering or caching data from a magnetic tape and disk unit for a CPU, i.e., a main memory was not only used as a CPU working store but also as a buffer for peripheral devices.

The performance monitoring referred to above has indicated that it is not always in the best interest of total data processing performance and integrity to always use a caching buffer interposed between a using unit and a backing store. For example, U.S. Pat. No. 4,075,686 teaches that a cache can be turned on and off by special instructions for bypassing the cache. Further, the backing store, or memory, was segmented into various devices with some of the devices or segments being bypassed, such as for serial or sequential input-output operations. This patent further teaches that, for certain commands, it is more desirable to not use cache than to use cache. U.S. Pat. No. 4,268,907 further teaches that, for a command specifying the fetching of data words, an indicator flag is set to a predetermined state. Such a flag conditions replacement circuits to respond to subsequent predetermined commands to bypass cache storage for subsequently fetched data words when the indicator flag is in the predetermined state to prevent replacement of extensive numbers of data instructions already stored in cache during the execution of such instructions. Further, U.S. Pat. No. 4,189,770 shows bypassing cache for operands but using cache for instruction.

In some storage hierarchies data integrity is ensured by transferring data to both the cache and a backing store whenever data is written to the memory. As an example see U.S. Pat. No. 4,045,781. While in many instances this may prove valuable, it does tend to have high data occupancy in the cache, which may have adverse effects on total performance in certain applications. U.S. Pat. No. 4,173,781 describes a table control system for ensuring coherence between various levels in a storage hierarchy. Several storage hierarchies have involved always updating a backing store after updating a cache, such as in U.S. Pat. No. 4,167,782. Such updating, when caching large amounts of data, can significantly use storage system time, thereby degrading performance, a factor to be controlled.

In a multilevel storage hierarchy including a direct access storge device and an electronic random access caching buffer, it is desired to always have data written to the DASD, which is a retentive store, as soon as possible. A retentive store maintains data storage with power off, while a volatile store loses data when power is removed. Such writing to the DASD ensures data integrity by keeping data in a retentive store as opposed to storing data only in a volatile electronic random access store.

SUMMARY OF THE INVENTION

It is the object of the invention to enhance operation of a data storage hierarchy, including a DASD and a volatile caching buffer, by selectively limiting data promotions from DASD to cache while still having sufficient data in cache to satisfy read requirements a high percentage of the time.

In accordance with the present invention, a storage hierarchy is controlled by monitoring a series of requests for access to the storage hierarchy received from a user and indicating when certain events occur. Such events include cache misses, particularly when a write operation occurs. Other events relate to the status of a last track referenced in the series of requests. When a DASD record is not modified in the last track referenced (LTR), the contents of this track on DASD may be promoted to cache. In one instance of control, when there are no writes to any track in a series of requests, the LTR data contents are moved to cache; with a write, the LTR data contents are not promoted. This action means that accessing data in a series of requests tends to reduce data promotions.

The invention also contemplates apparatus consonant with the method of the invention set forth above.

The foregoing and other objects, features, and advantages of the invention will be apparent from the following more particular description of the preferred embodiments of the invention, as illustrated in the accompanying drawings.

DESCRIPTION OF THE DRAWING

FIG. 2 is a block diagram of a peripheral storage system type of storage hierarchy employing the present invention as set forth in FIG. 1.

DETAILED DESCRIPTION

Figure 1:
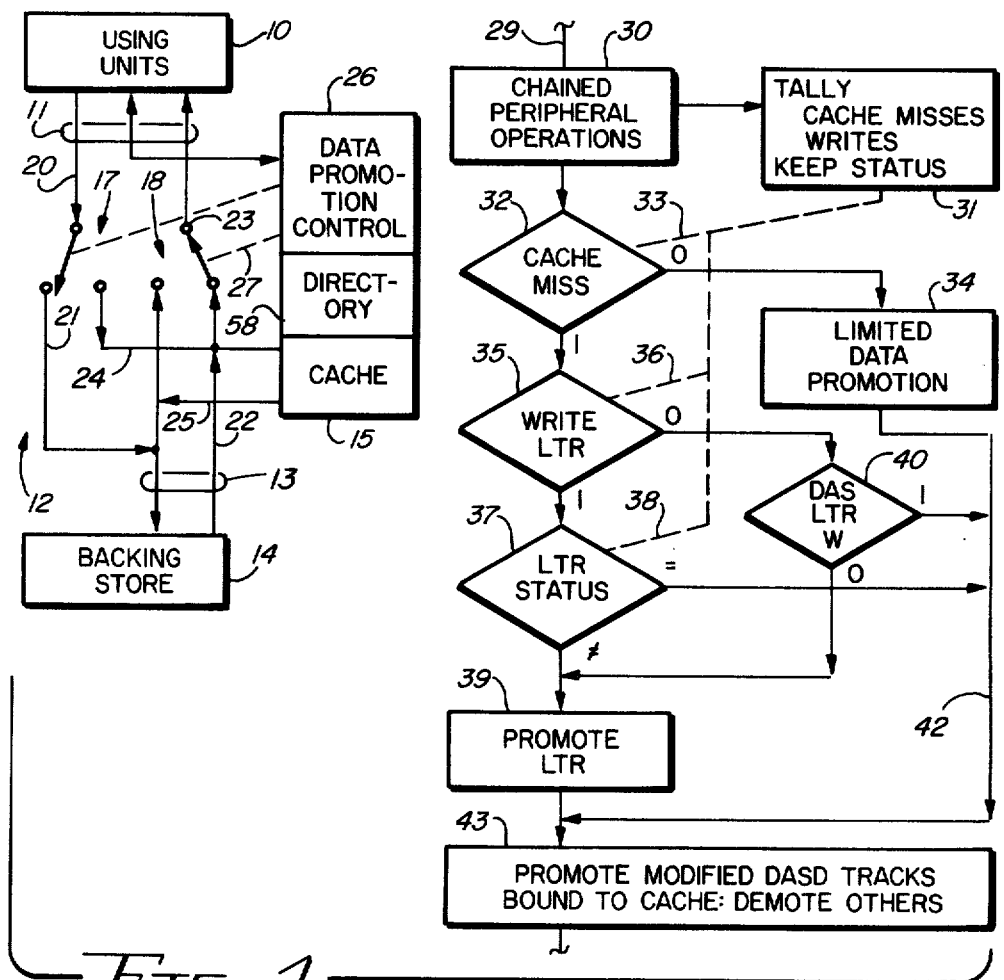
FIG. 1 includes a block diagram and a machine operations chart of a storage hierarchy employing the present invention.

Referring now more particularly to the drawing, like numerals indicate like parts and structural features in the various diagrams. Using units 10, such as hosts, central processing units and the like, are coupled via input/output connections 11 to a storage hierarchy having a storage directory 12, and preferably in the form of a peripheral data storage system. The storage hierarchy includes a backing store 14 and a cache or caching buffer store 15. Data is transferred between the backing store 14 and the caching store 15 via a set of device connections 13. Selectively, using units 10 can access cache 15 or backing store 14 in accordance with the switch 17, 18 settings. For example, switch 17 set as shown couples the output bus 20 of input/output connections 11 to device input connections 21 for transferring data from using units 10 directly to backing store 14. Backing store 14 supplies data directly to using units 10 via device output bus 22 of device connection 13, thence through switch 18 and input bus 23 of input/output connections 11 to using units 10. Actuating switches 17, 18 to the alternate position connects output bus 20 to cache input bus 24, while cache output 25 is connected by switch 18 to using units input bus 23. Buses 24, 25 also provide for data transfer through device connections 13 to backing store 14. In a preferred construction of the invention, backing store 14 includes a plurality of direct access storage devices (DASD), while cache 15 is an electronic random access memory, preferably of the semiconductive type.

In accordance with the invention, the illustrated storage hierarchy is operated by data promotion control 26 to limit data promotions from store 14 to cache 15 in accordance with cache status relating to the last track referenced, cache misses (reference is required to backing store 14) and write operations. Preferably the contents of only one track of DASD, or less, are promoted to cache for each chain of peripheral commands (series of user requests for access to the storage hierarchy).

Analyzing writing data operations and then removing data from cache 15 in accordance with such analyzation tends to encourage write misses of cache 15, hence encourages writing directly to backing store 14. Accordingly, in a series of operations such as represented as beginning at 29 and continuing at 30 as chained peripheral operations, all write operations of a given type are tallied at 31. Whether or not a cache miss occurs (data access request cannot be completed by cache 15 without storage space allocation) is also tallied. The status of tracks stored in cache is maintained in directory 58. Upon completion of chained peripheral operations, the storage hierarchy at 32 examines the tallied writes, misses and status. For certain operations occurring, storage director 12 limits the promotion of data to cache as detailed in FIGS. 3 and 4. These data promotion controls generally diminish data promotions when write operations occur.

Limiting data promotions subsequent to the completion of the chain of peripheral operations includes examining the tally of 31 at 32 as indicated by dashed line 33 for cache misses. If there is no cache miss in the chain of peripheral operations, then a limited data promotion can occur at 34. For example, if the last track referenced LTR which is contained in cache 15 has an incomplete replication of data from a storage area of backing store 14, then the limited data promotion at 34 may include moving data from backing store 14 to cache 15 for completing the cache 15 replication. A first control moves data to complete the replication only if a reference is made to the area of the track not residing in cache 15. An alternate, or second, control moves data to cache 15 to complete the replication of data in cache 15 if the track is a last-referenced track in a chain of commands. If the replication in cache 15 is complete, no data is moved. In a DASD storage system, such storage area in the cache holds the data contents of a single record track in the backing store 14 DASD.

For cache miss at 32, the storage hierarchy at 35 examines whether or not a write operation occurred to the last track referenced as indicated from tally 31 by dashed line 36. If the last track referenced had a write operation, then the status of the replication in cache 15 with respect to the data contents of the corresponding storage track in backing store 14 is examined at 37. If the status of the two copies of data is identical at 37, as indicated by dashed line 38, then no further action is required; i.e., there is congruence between cache 15 and backing store 14 data, i.e., has data integrity. If there is noncongruence, i.e., the replication in cache 15 is different from the copy in backing store 14, then at 39 the contents of the last track referenced in backing store 14 are promoted to cache 15. The difference between the two copies may result from writing data to backing store 14; for example, if there were no write operation at 35 to the last track referenced, then at 40 storage hierarchy examines if the last track referenced was in the backing store 14 and a write operation occurred to a track other than LTR within the chain of peripheral commands; if such is the case, no data is promoted from backing store 14 to cache 15. Otherwise, the last track referenced is promoted to cache 15 from steps 35, 40 or 39. Logic path 42 is followed to promote modified DASD tracks bound to cache at 43. That is, using unit 10 can indicate to the storage hierarchy that data should be kept in cache 15, i.e., is bound to cache. In this event, when backing store 14 is updated to the exclusion of cache 15, the received instruction to maintain data in cache 15 is still in force. Accordingly, to maintain data integrity, such modified data is moved from backing store 14 to the data from the bound tracks stored in cache 15. Data stored in cache 15 corresponding to data modified and stored in DASD 14 that is not bound to cache is demoted (removed) from cache. Such operation completes the post-chained peripheral operations function of the present invention.

FIG. 2 illustrates a preferred embodiment of the invention as employed in a two storage director 12 arrangement. Each storage director 12 includes a plurality of so-called channel adaptors 50, also separately denominated as CCA through CAH, which connect the respective storage directors 12 to a plurality of using units 10 via a plurality of input/output connections 11. Each storage director 12 includes a programmed processor 51, which as usual includes a processing unit (not shown) having a control store (not shown) which contains computer programs for performing the storage director functions. The programmed processor includes programs consituting address and command evaluator ACE 52 which receive and evaluate peripheral commands. Such functions are also performed in present day storage directors for non-cached DASD as widely sold throughout the world. The programmed processor 51 also includes direct access control DAC 53, which responds to commands evaluated and decoded by ACE 52 to control data transfers between using units 10 and addressed ones of DASD 14, and which also provides device commands to DASD 14 for performing well-known DASD access and control functions. DAC 53 also creates write tally 31 which is located in its control store (not shown). Program processor 51 further includes CAC 54 which is a cache access control for accessing cache 15. CD bits 120, one bit for each of the DASDs 14, are accessed by DAC 53 and CAC 54 respectively for determining whether to access cache or DASD and for setting the bits to D at a cache miss. Connections from storage director 12 to DASD 14 are via DASD circuits 55, which are constructed using known device adaptor and data flow design techniques. Cache 15 is accessed via memory circuits 56, which include those circuits for generating addresses and access requests. Cache 15 is a portion of a large random access store 57, hereinafter referred to as a system store. A directory 58 for cache 15 is also stored in system store 57. The directory 58 is accessed using known hashing techniques based upon the address structure of DASD 14. Each unit of data, track or record stored in cache 15 has an entry in directory 58, as is known in the data processing art. The allocatable unit of storage in cache 15 has a capacity to store the contents of one record track in any of the DASDs 14.

Access to DASDs 14 is via a so-called string arrangement in which a plurality of DASDs 14 are connected to the storage directors 12 via controllers 65, separately denominated as DCA through DCD. Each storage director 12 connects to the controllers 65 via a daisy-chain device connection 13. A radial connection of known design may also be employed. The operation of the FIG. 2 illustrated system in accordance with the invention is best understood by referring to FIGS. 3 and 4.

Figure 3:
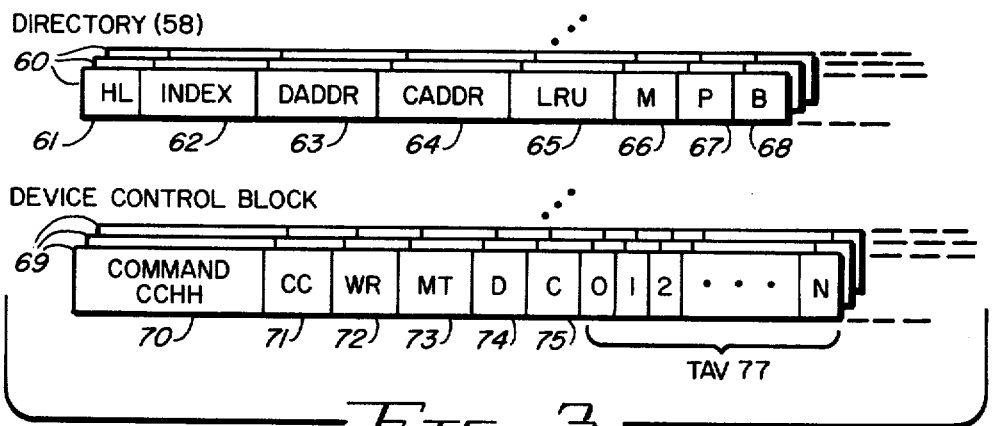
FIG. 3 diagrammatically illustrates a cache directory and device control block usable with the FIG. 2 illustrated embodiment.

FIG. 3 illustrates a directory and device control block structure usable with the present invention. Directory 58 includes a plurality of addressable registers 60, preferably within a system of electronic random-access storage including cache 15. There is one register 60 for each of the allocatable portions of cache 15. When backing store 14 contains DASD, the allocatable portions are preferably the extent of storage area required to store the data contents of one DASD track. In other arrangements the track of DASD may be broken into segments or record areas. In those situations where the record areas are fixed lengths, the allocatable storage space of cache 15 can be set to those record area sizes. In any event, there is one register 60 for each of the allocatable storage areas of cache 15, and these registers are addressable units. HL's 61 in each of the registers 60 constitute a singly-linked list for tieing together a hash class, i.e., an addressing segment of cache 15 based upon the addressing structure of backing store 14. Such hash addressing is known and not detailed for that reason. Index 62 is useful for identifying the directory registers 60 without address hashing to HL 61. DADDR 63 contains the device address of backing store 14; the address includes denomination of which DASD is being addressed, the cylinder address CC, the head or record surface address HH and a record number, if pertinent. CADDR 64 contains the address in cache 15 storing the data represented by the entry in the respective register 60. LRU 65 is a portion of doubly-linked list having an entry in each of the registers 60 useful in replacement control of cache 15 stored data contents. One end of the doubly-linked list is the least recently used allocatable storage area of cache 15, while the other end of the doubly-linked list is the most recently used allocatable storage area. Updating the LRU doubly-linked list is known and not described for that reason. M bit 66 indicates whether or not the indicated data contents of cache 15 were modified by receiving data from a using unit 10. This bit corresponds to the later-described track activity vector TAV. This indication is a portion of tally 31. P section 67 indicates whether or not the storage area of cache 15 has a complete replication of the data from backing store 14 and the address within the track at which the partial copy of data begins. The operation is such that a partial copy begins at this identified address and extends to the end of the track. For example, when the allocatable storage sizes are the extent of DASD tracks in backing store 14, then the first addressed portion of a track may not be the first byte in the track as measured with respect to the usual track index. In this case only the last portion of the track is promoted to cache 15, such that only a partial copy is maintained in cache 15 and as indicated by the P bit 67. B bit 68 indicates that the using unit 10 has sent a signal to the storage hierarchy that the data contents in the storage area indicated by the register 60 in cache 15 are to be maintained in cache 15. Only a subsequent signal from a using unit 10 erasing B bit 68 using known peripheral command procedures will change B bit 68. M bit 66 is reset whenever the contents of cache 15 and the backing store 14 with regard to the particular data stored are made equal. Similarly, the P bit 67 is reset whenever cache 15 receives a complete replication of the data stored in backing store 14.

The illustrated device control block DCB is stored within programmed processor 51, such as in a program store (not shown). Functions DAC 53 and CAC 54, as well as ACE 52, access DCB in controlling the storage hierarchy. There is one entry 69 for each of the addressable devices in backing store 14. A first portion 70 contains the current command received from using units 10 during the current chained peripheral operations associated with the addressed device. The received command types are listed only once, i.e., read data, read home address, format write, etc. Also each CCHH address used is also listed with identification of the last command received from using units 10. Section 71 contains the cylinder address CC for the cylinder of tracks currently being accessed. WR 72 indicates whether or not a write operation has occurred in the chain of peripheral operations. Bit MT 73 indicates whether or not a multitrack MT operation occurred in the chain of commands. That is, a peripheral command may require a data transfer from a plurality of record tracks within a given cylinder CC address. D bit 74 indicates a direct mode access, such as caused by a cache miss, was made to the device during the chained peripheral operations. That is, if cache 15 does not have space allocated to service a data access request (read or write), then, within the cylinder, CC access to backing store 14 satisfies the request for that particular data access as well as all subsequent accesses within the cylinder and within the chained peripheral operations. C bit 75 indicates that cache 15 was accessed or intended to be accessed (cache operating mode as opposed to a cache bypassing mode such as taught in U.S. Pat. No. 4,075,686). When both bits D 74 and C 75 are set to unity, a cache miss is indicated. Track activity vector TAV 77 contains one bit position for each record track in a cylinder set of such tracks. So long as CC 71 is constant, the TAV 77 contains a bit pattern showing which tracks in DASD 14 received data being written to the storage hierarchy. TAV 77 is updated by each write command execution in a usual manner. Both of the data structures shown in FIG. 3 will contain other controls not pertinent to the understanding of the present invention but which may be desirable for operating a storage hierarchy.

Figure 4:
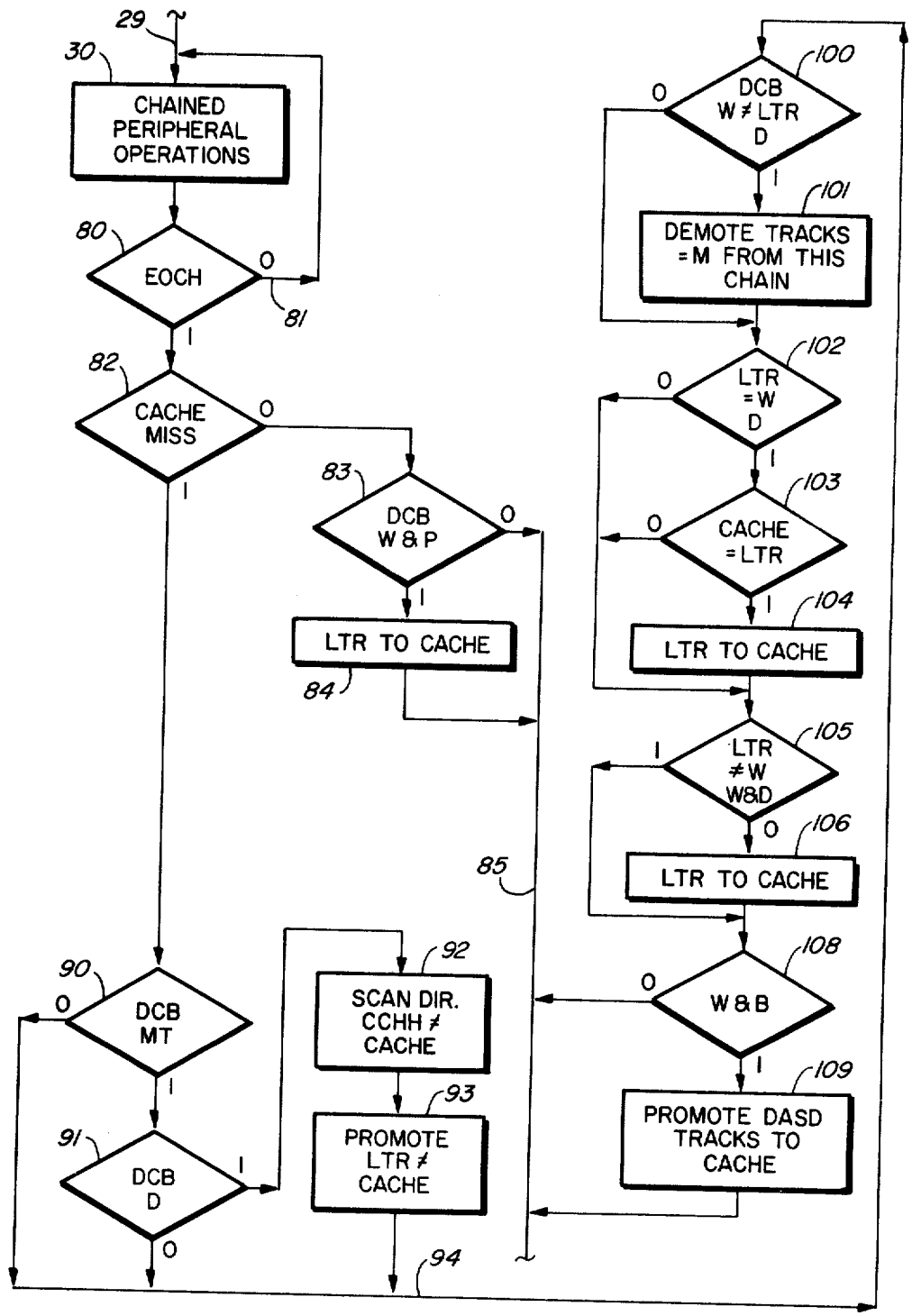
FIG. 4 is a machine operations chart detailing machine operations in the FIG. 2 illustrated embodiment.

FIG. 4 is a machine operations chart showing an operation of the present invention in the illustrated embodiment. A received command at 29 institutes the chained peripheral operation at 30. At 80 the end of the chain is checked (EOCH). In the IBM 360-370 series of computers, the receipt of a so-called SUPPRESS OUT tag signal at final status time indicates that the next received peripheral command will be in the same chain of commands. Accordingly, receipt of this tag signal indicates that the chain is continuing such that logic path 81 is followed to receive the next command at 29 in the chain of peripheral operations. When the SUPPRESS OUT tag signal is not received, then the end of a chain is indicated such that at 82 the storage hierarchy determines whether or not a cache miss has occurred for the addressed device handling the chained data storage operations. If there was no cache miss, i.e., all of the data access requests in the chained peripheral operations were satisfied through accessing cache 15, then at 83 TAV 77 of device control block of FIG. 3 is accessed to see if there were no write operations in the chain by examining field 72, and to see whether or not only a partial copy of the last track referenced, as indicated in command list 71, is in cache 15 as indicated by P bit 67 of directory 58. If only a partial copy exists in cache 15 and there were no write operations, there is a high likelihood that the same track will be referenced again in a subsequent chain of operations. Accordingly, when sensing the second control, the copy of data in cache 15 is completed by transferring at 84 the remainder of the data of the last track referenced from backing store 14 to cache 15. When cache 15 contains a complete copy of the last track referenced which is identical to the copy of data stored in backing store 14, then no data is promoted and logic path 85 is followed for receiving the next command in a separate chain of commands or for performing other asynchronous operations beyond the scope of the present description.

With a cache miss at 82, all multitrack operations of the chained peripheral operations are examined to determine whether or not some data should be promoted to cache 15 for satisfying future references to the storage hierarchy. At 90 device control block bit 73 of FIG. 3 is examined to see if a multitrack operation has occurred. If no multitrack operation occurred, then the steps 91 through 93 are omitted and logic path 94 is followed to later-described machine operations. For a multitrack operation detected at 90, at 91 the storage hierarchy again examines the device control block to see if the D bit 74 is set such that the last track reference was to backing store 14. If there was a cache miss at 82 and a cylinder CC boundary was crossed, then cache 15 would again be accessed. Accordingly, at 91 when there was a cache miss at 82 and a cylinder boundary was not crossed, or at 92 when a subsequent miss caused access to backing store 14, directory 58 is scanned to find a last track referenced within the multitrack operation that has a copy of data in cache 15 different from a corresponding copy of data in backing store 14. The first track examined is the last track referenced. Within a given cylinder, random accesses to the tracks are listed in TAV 77 by setting the track indicating bits irrespective of the order of accessing; hence the "last track referenced" is the highest numbered track in the cylinder that was accessed, even though it may have been the first track referenced in a series of track accesses. When the directory 58 M bit 66 for that last track referenced is equal to one, then the contents of the last track referenced in backing store 14 are promoted to cache 15 at 93. If the last track referenced has a copy in cache 15 that is identical to that stored in backing store 14 (M=0), then the next to the last track referenced is examined and so forth until the scan is completed of all the tracks accessed during the multitrack operations, or until a last one of the tracks having a noncongruent copy of data in cache 15 with respect to data stored in backing store 14 is found. Then the data contents of such track having the noncongruent copy of data in cache 15 is a last track referenced for purposes of promoting data to cache 15 by step 93.

From logic path 94 the storage hierarchy at 100 determines whether or not data should be demoted at step 101. Again the device control block of FIG. 3 is examined to see if the last track referenced was the subject of a write operation. This means that without a write operation there is a great likelihood that the last track referenced will be referenced again; it therefore should remain in cache 15. Also, the D bit 74 is examined to see if a cache miss has occurred; if such has happened, then other operations preceding the last track referenced may have resulted in write operations to backing store 14 on tracks other than the last track referenced. Accordingly, the storage hierarchy examines TAV 77 for all write operations which have written to backing store 14 to the exclusion of cache 15. The bits in TAV 77 (which within a cylinder represent the M bits 66 of directory 58 for these tracks) are examined for each track in the cylinder indicated in DADDR 63 of directory 58. These bits of TAV 77 indicate that the copy of data in cache 15 is noncongruent with the copy of data in backing store 14. Since a write operation occurred to these tracks, the likelihood of a subsequent read reference to these tracks is less than the likelihood of subsequent write commands; in fact, the likelihood of subsequent write commands can be quite high. Accordingly, the tracks stored in cache 15, having been modified within the given chain of peripheral operations, are demoted from cache 15, i.e., effectively erased by deleting the entry in directory 58. Such entry deletion is well known in the data processing art and is not detailed for that reason. This demotion provides congruence between the data stored in cache 15 and backing store 14 and avoids work queue buildups relating to promoting data from backing store 14 to cache 15.

Further examinations are made to determine whether or not a copy of data corresponding to the data contents in the last track referenced and stored in backing store 14 should be promoted to cache 15. At 102, if the LTR was written into as indicated by bit 72 of the device control block and D bit 74, it is possible that there is noncongruence between the cache 15 copy of the data and the backing store 14 copy. At 103 the storage hierarchy examines directory 58 to determine whether or not a storage area of cache has been allocated for the identified last track referenced. If so, the data modified by writing into backing store 14 for the last track referenced is moved to cache 15 at 104. In all other respects no data is promoted, i.e., no space is allocated in cache 15 for promoting the modified data from backing store 14 to cache 15. The rationale here is that, if space was not allocated in cache 15 before the write operation, there is a greater likelihood that the track will not be referenced for a read operation again for some time. Therefore, there is no need to promote the data. At 105 when the last track referenced was not written into, the D bit 74 indicates a cache miss (read or write), and a write command was received for a track other than the last track referenced, then no data is promoted to cache 15. However, if the last track referenced in backing store 14 and the chain had no write operations, then there is a greater likelihood that the last track referenced in backing store 14 will be referenced for a read operation again soon. Therefore, at 106 the data contents of the last track referenced in backing store 14 are moved to cache 15.

The FIG. 1 step 43 promotion of data to bound tracks is performed by operational steps 108 and 109. At 108 the storage hierarchy examines to see if any bound tracks in cache 15 was written to in backing store 14. This determination is made by scanning the command list 71 and then accessing the corresponding entries in directory 58 to examine B bit 68. Whenever WR bit 72=1 for a given CCHHR address, and the corresponding B bit 68 is unity, then at 109 the contents of backing store 14 corresponding to the address CCHHR are promoted to cache 15. Such promotion can include a plurality of tracks, since a plurality of tracks can be bound simultaneously within cache 15. Then logic path 85 exits the operation.

While the invention has been particularly shown and described with reference to preferred embodiments thereof, it will be understood by those skilled in the art that various changes in form and details may be made therein without departing from the spirit and scope of the invention.

What is claimed is:

1. The machine-implemented method of operating a data storage hierarchy having a backing store and a caching buffer store with means to store data in said buffer store based upon addressable data storage areas of said backing store, both of said stores having a plurality of addressable data storage areas;

including the steps of:

monitoring a plurality of series of requests for accessing said storage hierarchy received from a user connected to the storage hierarchy and setting a status bit for indicating whether or not predetermined writing operations occurred within said series of requests, respectively, each said series of requests having a plurality of access requests for accessing the data storage hierarchy a respective plurality of data storage areas; and during any of said series of requests which include writing data to said storage hierarchy during any one of said requests in such any series of requests, storing such written data in said backing store;

determining completion of said any series of requests;

upon said determination of said completion of said any series of requests, determining whether or not the contents of that addressable storage area of said buffer store storing a supposed replication of data from said backing store addressable area accessed by the last access request in said any series of requests actually is storing an exact replication of data stored in said backing store addressable storage area addressed in said last access request; and when said determinations indicate a predetermined data contents comparison result of equality, promoting of said buffer store predetermined data from only a predetermined one of said plurality of data storage areas of said backing store accessed during said any series of requests irrespective of the data storage function requested during said last access request in said any series of requests, and for comparison results other than said equality comparison results, promoting no data from said backing store to said buffer store.

2. The machine-implemented method set forth in claim 1 further including the steps of:

during said any series of requests accessing a plurality of said data storage areas, memorizing the addresses of said storage areas having modifications due to receiving data written to said storage hierarchy; and upon completion of said any series of requests, examining said memorized accessed addresses and promoting the data contents of a predetermined one of said storage areas in said backing store, indicated by a one and only one of said data storage areas storing modified data, to a data storage area of said buffer store.

3. The machine-implemented method set forth in claim 2 further including arranging said memorized addresses in ascending numerical order, scanning said arranged addresses in descending order and for each scanned memorized address doing said comparison; and upon detecting a difference in said comparison of stored data in the data storage areas indicated by scanned addresses, promoting the data contents of said data storage area of said backing store indicated by the scanned address to said buffer store, and terminating said scan.

4. The method set forth in claim 1 further including monitoring and indicating received access requests for accessing said buffer store; and for such buffer store access requests, identifying a last received one of said access requests, for such last received one of said access requests, examining said buffer store to determine whether or not a complete copy of data stored in the backing store storage area resides in the data storage area of said buffer store having data stored therein from said last accessed storage area of said backing store, for less than a complete copy, determining and indicating which data stored in said backing store respective storage area related to said last received one of said access requests is not stored in said buffer store accessing a predetermined one of said storage areas in said backing store that stores a complete replication of data for said last accessed buffer store storage area and moving sufficient data including said data identified as not stored in said buffer store to said last accessed storage area to complete the data replication therein.

5. The machine-implemented method of operating a data storage hierarchy having a backing store and a caching buffer store with means to store data in said buffer store based upon addressable data storage areas and which are selected replications of data stored in said backing store, both of said stores have a plurality of allocatable-addressable data storage areas;

including the machine-effected steps of:
receiving from a using unit attached to said data storage hierarchy a series of access requests for accessing predetermined ones of said data storage areas;

executing said received access requests as a series of data storage operations with diverse ones of said storage areas, including for each received request determining a cache hit or miss based upon whether or not said buffer store has data storage areas identifiable therewith, respectively, and memorizing whether or not each said operation is a predetermined type of write operation for storing data in said hierarchy and further memorizing which of said data storage areas were accessed;

upon completing said executing, for determining whether a read or write operation occurred, examining the operation of a last accessed one of said storage areas and whether or not said buffer store has one of its data storage areas allocated to store data stored in said last accessed data storage area of said backing store; and transferring to said buffer store a copy of data stored in said last accessed data storage area of said backing store if written into or, if a cache miss was tallied and no data storage area was written into during said executing said series of requests.

6. The method set forth in claim 5 further including the machine-effected steps of:
monitoring and indicating received access requests for accessing said buffer store; and for such received buffer store access requests in said series of access requests, identifying a last received one of said access requests, for such last received one of said access requests, examining said buffer store to determine whether or not a complete copy of data stored in the backing store storage area resides in said storage area of said buffer store having data from said last access storage area of said backing store, for less than a complete copy, determining and indicating which data stored in said backing store respective data storage area related to said last received one of said access requests is not stored in said buffer store, accessing a predetermined one of said data storage areas in said backing store that stores a complete replication of data for said last accessed buffer store storage area and moving sufficient data including said data identified as not stored in said buffer store to said last accessed data storage area of said buffer store to complete the data replication therein.

7. The machine-implemented method of operating a data storage hierarchy having a caching buffer store and a backing store, means to transfer data between said stores, said hierarchy being adapted to be connected to a user unit, each store having a plurality of like-sized allocatable-addressable data storage areas;

the improvement including the steps of:
in a series of user unit access requests, accessing a plurality of said allocatable data storage areas, keeping a list of write data storage operation accesses wherein the caching buffer store has no allocatable data storage areas relatable to such accesses and identifying the type of operation for a last data storage area referenced, LTR;

determining that said series of user unit access requests has been completed;

upon said determination of completion of said series of user unit access requests, examining the caching buffer store to determine if the full data contents of LTR are also stored in one of said allocatable data storage areas of said caching buffer store; if so, promoting no data from said backing store; if not, promoting data to said buffer store related to data contents of said LTR only if a one of said accesses of said series of user unit access requests accessed said backing store independently of said buffer store and only if predetermined storage operations for storing data in said storage hierarchy did not occur in said series of user unit access requests whereby limited data is promoted to said buffer store in response to only reading data from said data storage hierarchy.

8. The method of operating a data storage hierarchy having a backing store and a caching buffer store with means to store data in said buffer store based upon addressable data storage areas of said backing store, both of said stores having a plurality of addressable data storage areas;

including the steps of:
receiving a series of access requests from a using unit attached to said data storage hierarchy for accessing a plurality of said data storage areas and for performing a series of functions including reading and writing data transfer operations during respective ones of said access requests for said plurality of data storage areas, respectively;

responding to said received access requests for performing said series of functions in said data storage hierarchy;

terminating said series of requests, then identifying a one of said access requests in said series of requests as a last access request of said series of access requests;

examining only said identified last one of said access requests in said series of requests and the storage area accessed in said identified last access request for ascertaining what last one of said data storage functions was performed by said data storage hierarchy as a result of receipt of said identified last access request and the data contents of said buffer store as a result of said last performed data storage function; and promoting predetermined data from said backing store to said buffer store when said examining shows a first predetermined function was performed by said storage hierarchy as a result of receipt of said identified last access request and that a cache bypass occurred during said series of functions.

9. In a data storage hierarchy having an electronic random-access buffer store connected to a backing store having a plurality of disk-type magnetic recorders, each recorder having a plurality of recording surfaces with addressable axially-aligned record tracks with all record tracks having a common radius constituting a cylinder set of record tracks, means for transferring data between said stores, receipt means in said data storage hierarchy having external connection means for receiving access requests from a unit external to said data storage hierarchy and indicating such received access requests and an end of chain signal;

the improvement including in combination:

a data promotion control having:

(a) for each of said magnetic recorders a separate track activity vector storage means for indicating which of said record tracks within a predetermined one of said cylinder sets of record tracks has received data to be recorded;

(b) end of chain means coupled to said receipt means for detecting said end of chain signal as an indication of an end of a series of data storage access requests for a given one of said magnetic recorders;

(c) control output means responsive to said end of chain means detecting an end of a series of access requests and to said track activity vector storage means indicating no predetermined writes to allow predetermined data promotion from said given cylinder set of tracks in said magnetic recorder to said buffer store when said indications show no predetermined writes and to inhibit said data promotion following said detected end of a series of access requests whenever said indication shows a predetermined write operation; and said control output means being connected to said end of chain means, said buffer store and to said backing store and to said track activity vector storage means.

10. The machine-implemented method of operating a data storage hierarchy having a backing store and a caching buffer store with means to store data in said buffer store based upon addressable data storage areas of said backing store, both of said stores having a plurality of addressable data storage areas; means in the data storage hierarchy for indicating that a series of related data storage access requests including an address for a one of said data addressable storage areas in said backing store, is continuing and indicating completion of such a series of related received data storage access requests received from a unit external to the data storage hierarchy, means in the data storage hierarchy coupled to said indicating means and to said buffer store and to said backing store for executing said indicated received data storage access requests;

including the machine-effected steps of:

during said indicated series of related received storage access requests, monitoring for a one of said related received storage access requests that indicates data is to be written to a one of said addressable data storage areas of said backing store, memorizing whether or not said monitoring identified a one of said related received storage access requests that indicated data was to be written to said one of said addressable data storage areas of said backing store;

sensing said indication of completion of such series of related received storage access requests;

in response to said sensing the indication of completion, examining said memorization of said monitoring, if said examination shows the memorization indicating a one of said related received storage access requests that indicated data was to be written to said one of said addressable data storage areas of said backing store, promoting no data from said backing store to said buffer store; and if said examination of said memorization of said monitoring reveals that no one of said related received storage access requests indicated data was to be written to said one of said addressable data storage areas of said backing store, allowing data to be promoted to said buffer store from said backing store before the onset of any ensuing additional series of related received storage area access requests.

11. A data processing system having a host processor connected to a data storage hierarchy, said data storage hierarchy having data-flow means for transferring data with the host processor and having control means for receiving and responding to commands supplied to the control means by the host processor and being connected to the data-flow means for controlling said data transfers in accordance with said received commands, a buffer store and a backing store in the data storage hierarchy coupled to said data-flow means for transferring data therebetween and coupled to said control means for responding thereto to perform data storage functions and each of said stores having addressable data storage areas for addressably storing data and enabling addressable access to data stored in any of said addressable data storage means;

the improvement including, in combination:

said host processor having means for sending said commands to said control means in a plurality of series of chained commands and for indicating an end of each such plurality of series of chained commands;

said control means having end of chain means for detecting said indicated end received by said control means;

buffer store management means in said control means coupled to said end of chain means, said buffer store, said backing store and to said data flow means;

control block means in said buffer store management means of said control means for tallying during each of said series of said chained commands predetermined types of data transfers between said backing store and said host processor effected via said data-flow means;

said buffer store management means having interchain means coupled to said end of chain means and responsive to said end of chain indication received from said host processor for each one of said series of chained commands for effecting the below-described buffer space management functions before onset of a predetermined succeeding series of chained commands:

data promotion evaluation means coupled to said control block means and said end of chain means for characterizing a just-completed chain of commands as to whether a write operation was conducted, whether a multitrack operation was conducted, whether a cache miss occurred and whether said buffer store was bypassed during a data transfer operation and generating an indication including predetermined combination of said characterizations for indicating whether or not data is to be promoted to said buffer store from said backing store before the onset of a predetermined succeeding chain of commands; and data promotion initiating means coupled to said data flow means for initiating data transfers from said backing store to said buffer store intermediate two successive chains of commands and coupled to said data promotion evaluation means for receiving said characterization indication and when predetermined combinations of said characterizations are indicated in said characterization indication, activating said data flow means to promote data contents from a predetermined one of said addressable data storage areas of said backing store to a predetermined one of said addressable data storage areas of said buffer store, said predetermined one of said addressable data storage areas of said backing store being a predetermined one of the backing store addressable data storage areas addressed during said series of chained commands, and said data promotion initiating means not initiating said promoting data when certain combinations of said characterization indications include an indication of a predetermined write operation.

12. The machine-implemented method of operating a data storage hierarchy having a buffer store connected to a backing store, each store having a plurality of addressable data storage areas, channel means for coupling the data storage hierarchy to an external using unit, the external using unit having means for indicating to said data storage hierarchy that a series of chained commands, including addresses of addressable data storage areas of said backing store, are being transmitted and when each such series of chained commands is being ended by an end of chain indication, means for allocating said addressable data storage areas of said buffer store to corresponding addressable data storage areas of said backing store such that the buffer store addressable data storage areas can selectively store replications of the data contents of said corresponding addressable data storage areas of said backing store;

including the machine-effected steps of:

during said series of chained commands tallying any write data operations and any cache misses, tallying said cache misses for each of said access requests received via said channel means when none of said addressable data storage areas of said buffer store are allocated to the addressed one of said addressable data storage areas of said backing store indicated by the access requessts, respectively;

upon receipt of said end of chain indication, first determining whether a one of said cache misses occurred during said series of chained commands;

if no cache miss is indicated by said tallying, then before onset of an ensuing series of chained commands promoting limited data from said backing store to said buffer store including selecting said limited data in accordance with the data content of a single predetermined one of said addressable data storage areas of said buffer store as such data content relates in a predetermined manner to the data content of its said corresponding one of said data storage areas of said backing store regardless of the number of said backing store addressable data storage areas accessed in said series of requests; and when a cache miss is indicated at the time of receipt of said end of chain indication, examining said tally for write operations;

for first predetermined write operations indicated in said tally, promoting no data from the backing store to the buffer store;

for second predetermined write operations, promoting the data contents of a given predetermined one of said corresponding ones of said addressable data storage areas to a predetermined one of said addressable data storage areas of said buffer store.

13. The machine-implemented method of operating a data storage hierarchy having a backing store and a caching buffer store with means to store data in said buffer store based upon addressable data storage areas of said backing store, both of said stores having a plurality of addressable data storage areas;

including the steps of:

monitoring a plurality of series of requests for accessing said storage hierarchy received from a user connected to the storage hierarchy and setting a status bit for indicating whether or not predetermined writing operations occurred within said series of requests, respectively, each of said series of requests having a plurality of access requests for accessing the data storage hierarchy; and during any of said series of requests which include writing data to said storage hierarchy during any one of said requests in such any series of requests, storing such written data in said backing store;

determining completion of said any series of requests;

upon said determination of said completion of said any series of requests, determining whether or not the cache was bypassed in said any series of requests for any one of its said plurality of access requests; and when said determinations indicate that the cache was bypassed, promoting predetermined data from said backing store to said buffer store which promoted data relates only to a predetermined one of said plurality of access requests in said any series of requests, and for no cache bypasses in said any series of requests, promoting no data from said backing store to said buffer store.

* * * * *